(12) United States Patent
Chen et al.

(10) Patent No.: US 9,057,409 B2
(45) Date of Patent: Jun. 16, 2015

(54) DRY DUAL CLUTCH TRANSMISSION ACTUATION SYSTEM USING ELECTRICAL MOTOR WITH FORCE AIDED LEVER

(71) Applicants: GM GLOBAL TECHNOLOGY OPERATIONS LLC, Detroit, MI (US); Shanghai Jiao Tong University, Shanghai (CN)

(72) Inventors: Li Chen, Shanghai (CN); Jian Yao, Shanghai (CN); Chunhao J. Lee, Troy, MI (US); Chengliang Yin, Shanghai (CN); Chi-Kuan Kao, Troy, MI (US); Farzad Samie, Franklin, MI (US); Dongxu Li, Warren, MI (US)

(73) Assignees: GM Global Technology Operations LLC, Detroit, MI (US); Shanghai Jiao Tong University, Shanghai (CN)

( * ) Notice: Subject to any disclaimer, the term of this patent is extended or adjusted under 35 U.S.C. 154(b) by 256 days.

(21) Appl. No.: 13/859,007

(22) Filed: Apr. 9, 2013

(65) Prior Publication Data

US 2014/0299441 A1 Oct. 9, 2014

(51) Int. Cl.
*F16D 23/12* (2006.01)
*F16D 13/44* (2006.01)
*F16D 28/00* (2006.01)
*F16D 21/06* (2006.01)

(52) U.S. Cl.
CPC ............... *F16D 13/44* (2013.01); *F16D 23/12* (2013.01); *F16D 28/00* (2013.01); *F16D 2021/0646* (2013.01)

(58) Field of Classification Search
CPC ....... F16D 13/42; F16D 13/44; F16D 23/142; F16D 23/145; F16D 2023/141; F16D 13/48; F16D 23/14; F16D 23/12; F16D 2023/23; F16D 2023/26
USPC ...................................................... 192/89.29
See application file for complete search history.

(56) References Cited

U.S. PATENT DOCUMENTS

| 1,552,368 | A | * | 9/1925 | Whitacre | 74/519 |
|---|---|---|---|---|---|
| 2,061,093 | A | * | 11/1936 | Tatter | 192/109 R |
| 2,249,043 | A | * | 7/1941 | Root | 192/70.29 |
| 2,296,535 | A | * | 9/1942 | Nutt | 192/99 S |
| 2,445,638 | A | * | 7/1948 | Saks | 267/161 |
| 4,821,858 | A | * | 4/1989 | Kabayama | 192/85.57 |
| 6,024,201 | A | * | 2/2000 | Husse et al. | 192/99 S |

* cited by examiner

*Primary Examiner* — Robert Hodge
*Assistant Examiner* — Ryan Dodd
(74) *Attorney, Agent, or Firm* — Quinn Law Group, PLLC

(57) ABSTRACT

An actuation system for actuating a clutch piston of a transmission includes an actuator and a lever. A first end of the lever is attached to the actuator. The lever is pivotable about a lever connection location. Movement of the actuator rotates the lever about the lever connection location. A spring assembly is pivotable about a spring connection location, and pivotably connected to the lever at a second end of the lever. When the actuator is disposed in an un-actuated position, the spring assembly is positioned such that a pre-loaded spring force is directed along a zero moment path to generate a zero moment in the lever. When the actuator is disposed in an actuated position, the spring assembly is rotated so that the spring force is directed along a moment generating path in order to generate a moment in the lever to rotate the lever.

19 Claims, 4 Drawing Sheets

US 9,057,409 B2

DRY DUAL CLUTCH TRANSMISSION ACTUATION SYSTEM USING ELECTRICAL MOTOR WITH FORCE AIDED LEVER

TECHNICAL FIELD

The invention generally relates to a dry dual clutch transmission for a vehicle, and more specifically to an actuation system for actuating the dry clutches of the transmission.

BACKGROUND

A dry dual clutch transmission uses two separate dry clutches, i.e., a first dry clutch and a second dry clutch, to engage a first gearset and a second gearset respectively. The first gearset is manipulated to obtain the odd numbered gear ratios, while the second gearset is manipulated to obtain the even numbered gear ratios. Accordingly, the first dry clutch is engaged to connect the first gearset to an input shaft for the odd numbered gear ratios, while the second dry clutch is engaged to connect the second gear set to the input shaft for the even numbered gear ratios. Gear ratios may be changed between the even numbered gear ratios and the odd numbered gear ratios without interrupting torque to the drive wheels of the vehicle by applying torque to one of the dry clutches at the same time torque is being disconnected from the other of the dry clutches.

Each of the first dry clutch and the second dry clutch are concentrically located with the input shaft about a central axis. Each of the first dry clutch and the second dry clutch is engaged by axially depressing a clutch piston along the central axis to move clutch plates (of the first dry clutch and the second dry clutch respectively) into frictional engagement. As such, a first clutch piston is depressed to engage the first dry clutch, and a second clutch piston is depressed to engage the second dry clutch.

SUMMARY

A transmission for a vehicle is provided. The transmission includes a housing, a dry clutch supported by the housing, and a clutch piston. The clutch piston is supported by the housing and moveable in an axial direction between an engaged position for engaging the dry clutch, and a disengaged position for disengaging the dry clutch. An actuation system is coupled to the clutch piston, and is operable to move the clutch piston from the disengaged position into the engaged position. The actuation system includes an actuator that is moveable between an actuated position and an un-actuated position, and a lever. The lever includes a first end and a second end. The first end of the lever is attached to the actuator. The lever is attached to the housing at a lever connection location, which is disposed between the first end and the second end of the lever. The lever includes a contact portion for engaging the clutch piston, which is disposed between the lever connection location and the first end of the lever. Movement of the actuator from the un-actuated position into the actuated position rotates the lever about the lever connection location to bias the contact portion of the lever against the clutch piston and move the clutch piston from the disengaged position into the engaged position. A spring assembly is pivotably connected to the housing at a spring connection location. The spring assembly is pivotably connected to the lever at the second end of the lever. The spring assembly is pre-loaded with a spring force that is directed outward away from the spring connection location. The spring assembly is positioned relative to the lever such that the spring force is directed along a zero moment path when the actuator is disposed in the un-actuated position. The zero moment path extends between and intersects the spring connection location and the lever connection location to generate a zero moment in the lever. The spring assembly is positioned relative to the lever such that the spring force is directed along a moment generating path when the actuator is disposed in the actuated position. The moment generating path does not intersect the lever connection location in order to generate a moment in the lever. The non-zero moment rotates the lever about the lever connection location to bias the contact portion of the lever against the clutch piston to move the clutch piston from the disengaged position into the engaged position.

An actuation system for actuating a clutch piston of a dual dry clutch transmission is also provided. The actuation system moves the clutch piston from a disengaged position into an engaged position. The actuation system includes an actuator that is moveable between an actuated position and an un-actuated position, and a lever. The lever includes a first end and a second end. The first end of the lever is attached to the actuator. The lever is pivotable about a lever connection location disposed between the first end and the second end of the lever. The lever includes a contact portion, which is disposed between the lever connection location and the first end, for engaging the clutch piston. Movement of the actuator from the un-actuated position into the actuated position rotates the lever about the lever connection location to move the contact portion of the lever. A spring assembly is pivotable about a spring connection location, and pivotably connected to the lever at the second end of the lever. The spring assembly is pre-loaded with a spring force directed outward away from the spring connection location. The spring assembly is positioned relative to the lever such that the spring force is directed along a zero moment path when the actuator is disposed in the un-actuated position. The zero moment path extends between and intersects the spring connection location and the lever connection location to generate a zero moment in the lever. The spring assembly is positioned relative to the lever such that the spring force is directed along a moment generating path when the actuator is disposed in the actuated position. The moment generating path does not intersect the lever connection location in order to generate a moment in the lever to rotate the lever about the lever connection location.

Accordingly, when the clutch piston is disposed in the disengaged position, the spring force is directed along the zero moment path, which applies no torque to the lever, thereby generating no or zero moment in the lever. As the actuator applies a force to the lever to move the clutch piston from the disengaged position into the engaged position, the lever rotates slightly about the lever connection location, which causes the second end of the lever to rotate as well. As the spring assembly is connected to the second end of the lever, the spring assembly is thereby caused to rotate about the spring location connection. As the spring assembly rotates about the spring location connection, the spring force is directed along a path that does not intersect the lever connection location, thereby applying a torque to the lever, which introduces a moment in the lever. As such, both the spring force and the force from the actuator combine to move the clutch piston into the engaged position. Because part of the force required to move the clutch piston is provided by the spring assembly, the force required by the actuator is reduced, thereby allowing for a smaller actuator unit.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
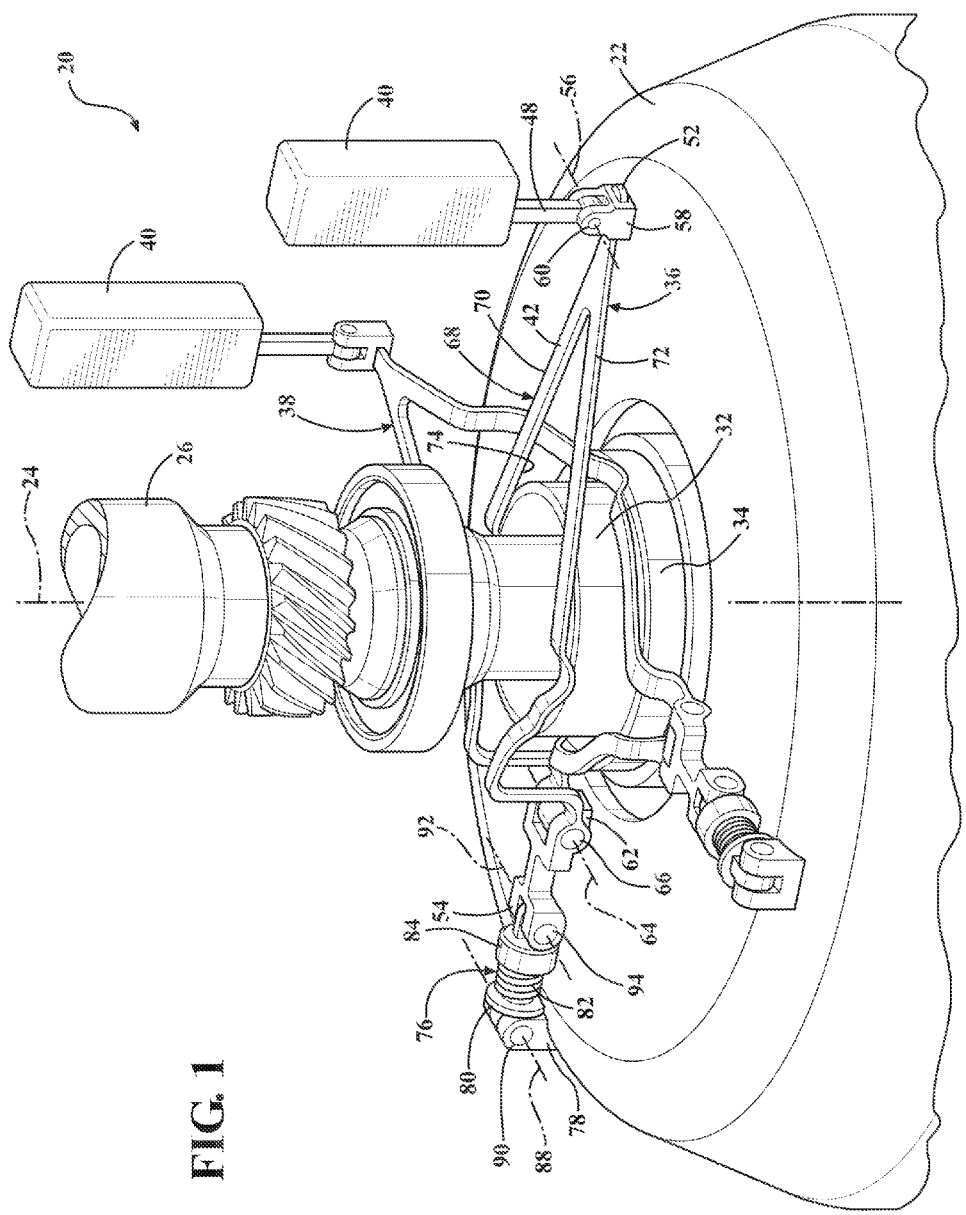
FIG. 1 is a schematic perspective view of a transmission for a vehicle.

Referring to the Figures, wherein like numerals indicate like parts throughout the several views, a transmission is generally shown at 20. Referring to FIG. 1, the transmission 20 includes a housing 22 that extends along a central axis 24. An input shaft 26 extends into and is supported by the housing 22. The input shaft 26 is disposed concentrically about the central axis 24. The transmission 20 further includes a first dry clutch 28 (shown in FIG. 2) and a second dry clutch 30 (shown in FIG. 2). As such, the transmission 20 may be referred to as a dual dry clutch transmission 20. Both the first dry clutch 28 and the second dry clutch 30 are supported by the housing 22, and are concentrically located about the central axis 24 with the input shaft 26. The input shaft 26 transfers torque from an engine (not shown) to two separate gearsets, i.e., a first gearset (not shown) and a second gearset (not shown), disposed within the housing 22 via the first dry clutch 28 and the second dry clutch 30 respectively.

The transmission 20 includes a first clutch piston 32 for engaging and disengaging the first dry clutch 28, and a second clutch piston 34 for engaging and disengaging the second dry clutch 30. Both of the first clutch piston 32 and the second clutch piston 34 are supported by the housing 22, and disposed concentrically about the central axis 24 with the input shaft 26. Both of the first clutch piston 32 and the second clutch piston 34 are independently moveable in an axial direction along the central axis 24 between an engaged position and a disengaged position. When disposed in the engaged position, the first clutch piston 32 and the second clutch piston 34 engage the first dry clutch 28 and the second dry clutch 30 respectively. The first dry clutch 28 and the second dry clutch 30 are disengaged when the first clutch piston 32 and the second clutch piston 34 are disposed in the disengaged position respectively.

The transmission 20 further includes a first actuation system 36 for engaging the first clutch piston 32, and a second actuation system 38 for engaging the second clutch piston 34. The first actuation system 36 is coupled to the first clutch piston 32, and operable to move the first clutch piston 32 from the disengaged position into the engaged position. The second actuation system 38 is coupled to the second clutch piston 34, and operable to move the second clutch piston 34 from the disengaged position into the engaged position. Both the first actuation system 36 and the second actuation system 38 operate in the same manner and include the same elements. The only difference between the elements of the first actuation system 36 and the second actuation system 38 is that the first actuation system 36 is configured to engage the first clutch piston 32, and the second actuation system 38 is configured to engage the second clutch piston 34. Accordingly, it should be appreciated that the general description of the features and operation of the actuation system described below is applicable to both the first actuation system 36 and the second actuation system 38. However, for clarity, the general description below references the features of the first actuation system 36 only, and omits references to the second actuation system 38.

Figure 2:
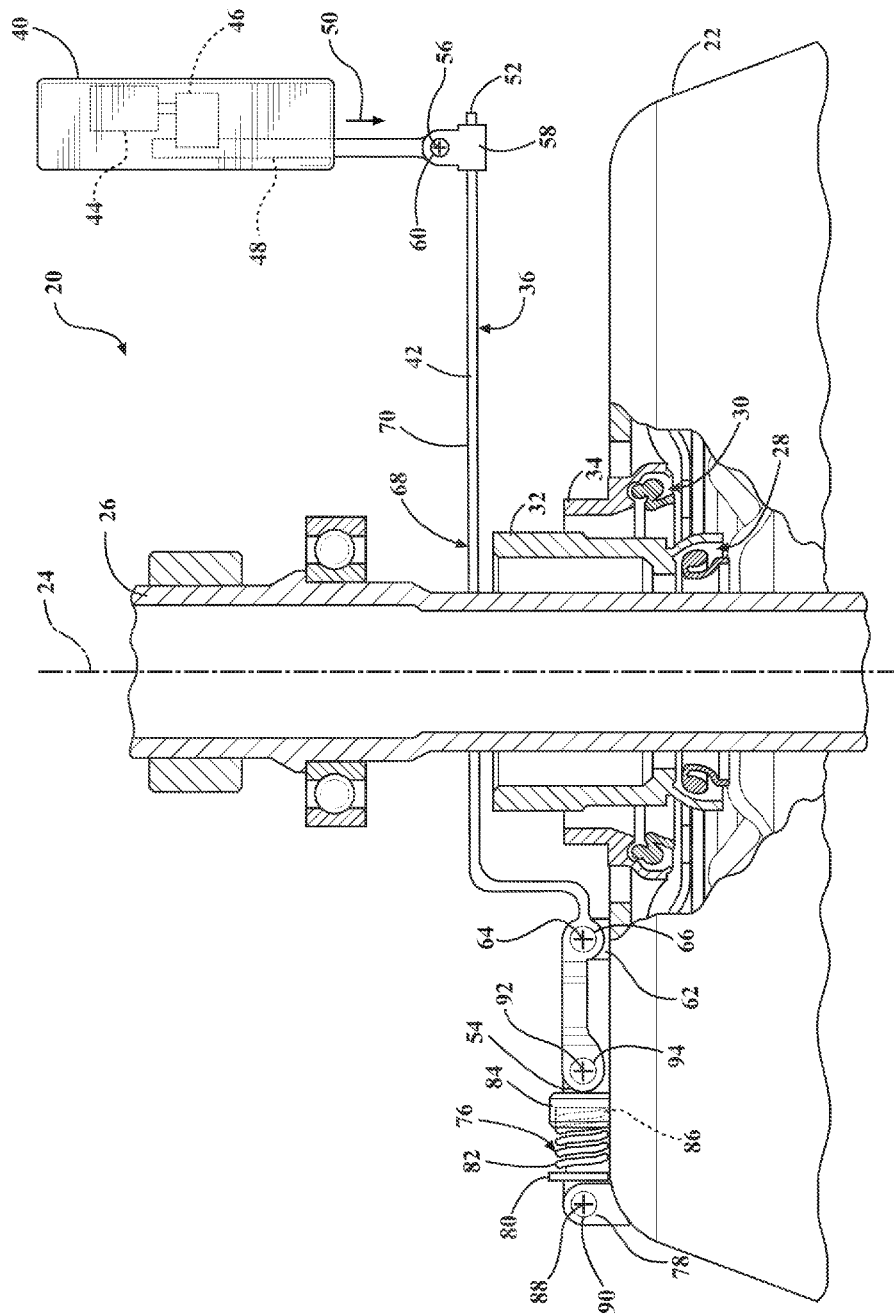
FIG. 2 is a schematic cross sectional view of the transmission showing a clutch piston in a disengaged position and an actuation system in an un-actuated position.
Figure 3:
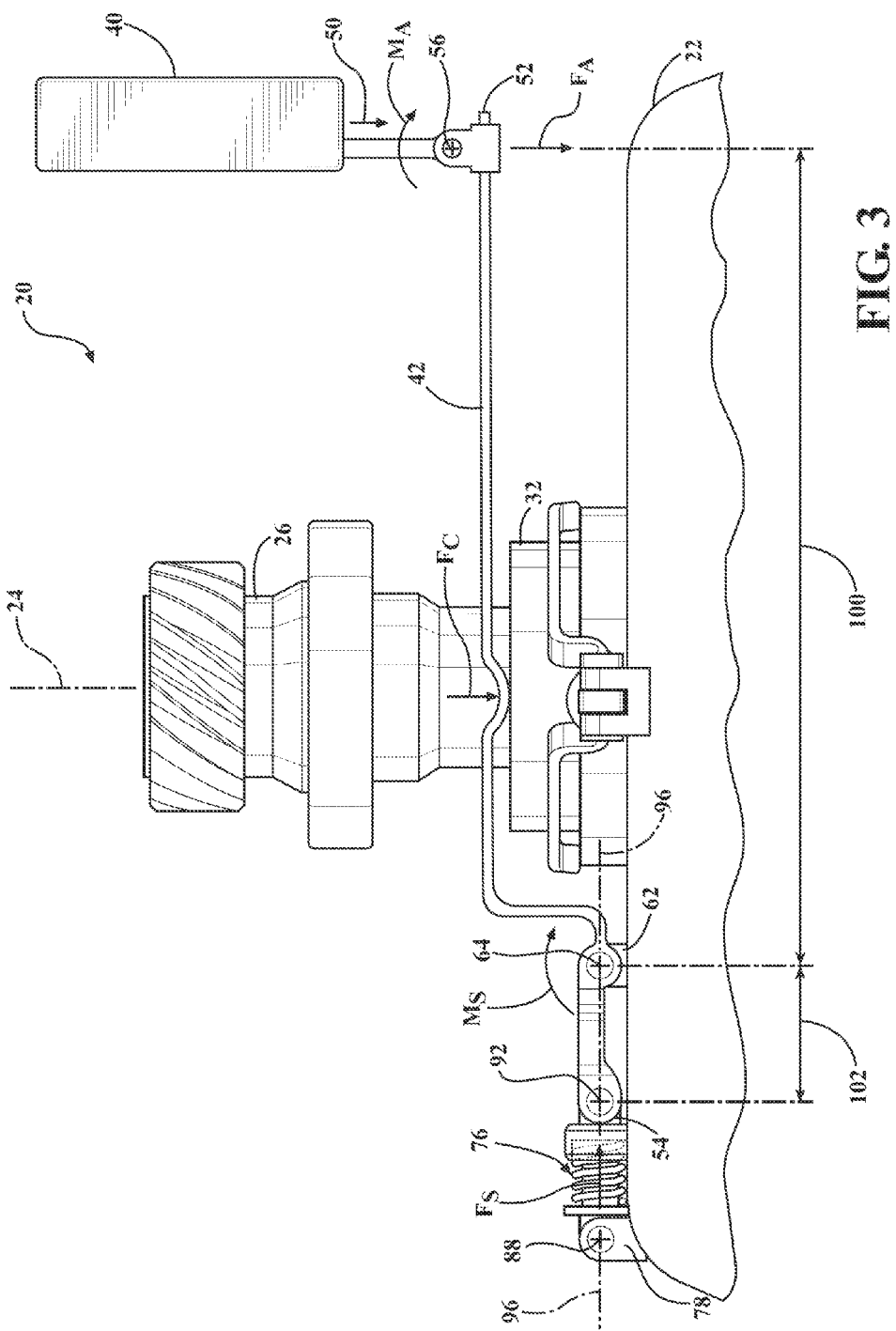
FIG. 3 is a schematic side view of the transmission showing the actuation system in the un-actuated position.
Figure 4:
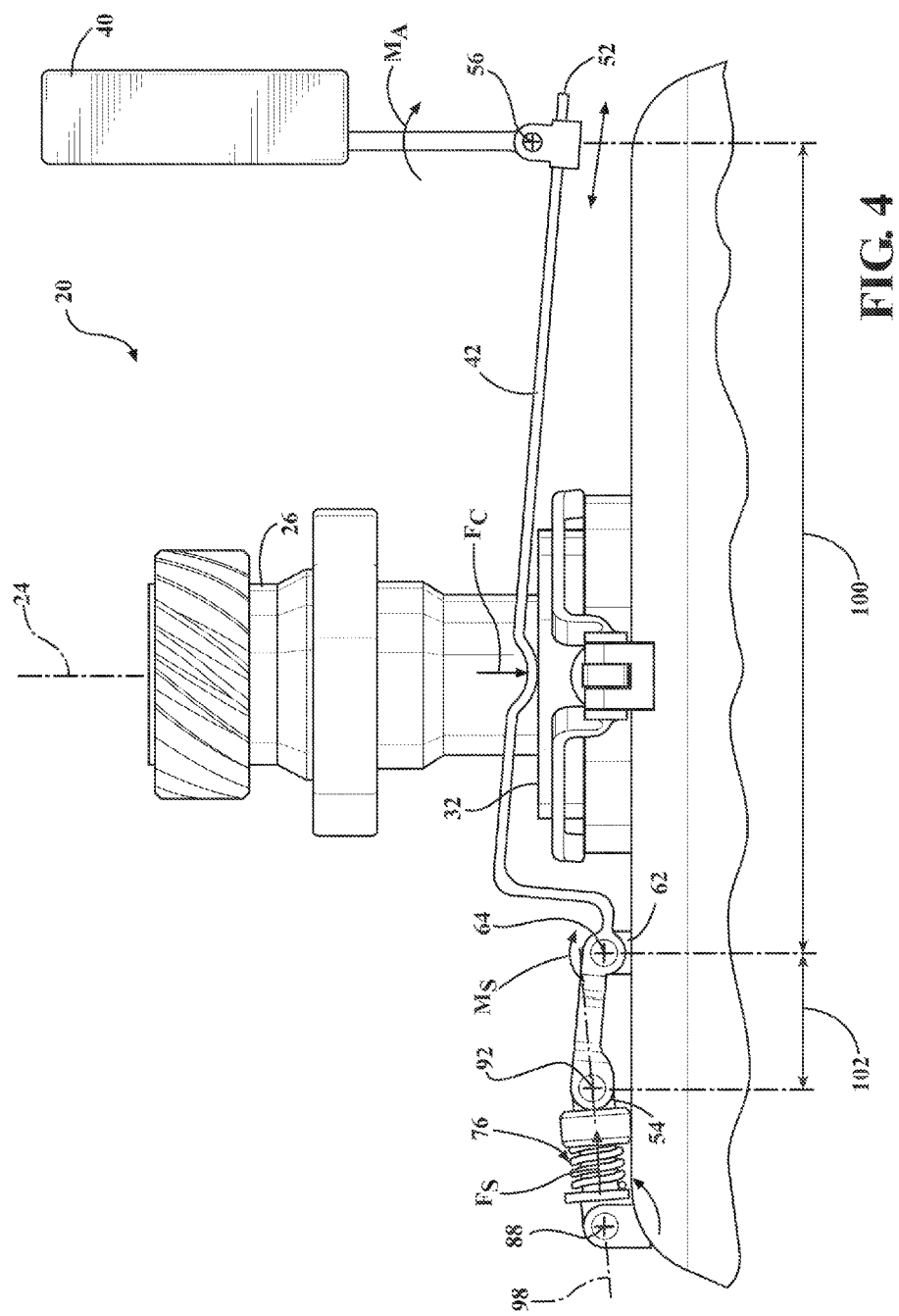
FIG. 4 is a schematic side view of the transmission showing the actuation system in an actuated position.

Referring also to FIGS. 2 through 4, the actuation system includes an actuator 40 and a lever 42. The actuator 40 is moveable between an un-actuated position, shown in FIGS. 2 and 3, and an actuated position, shown in FIG. 4. The actuator 40 may include any device capable of moving an object in an axial direction along the central axis 24. For example, the actuator 40 may include, but is not limited to, a rotary motor 44 cooperating with a ball screw device 46 to move a shaft 48 in the axial direction, indicated by arrow 50, along the central axis 24. The actuator 40 may be coupled to the housing 22 of the transmission 20, or may be mounted to some other feature of the vehicle.

The lever 42 includes a first end 52 and a second end 54. The first end 52 of the lever 42 is attached to the actuator 40. The lever 42 may be coupled to the actuator 40 in any suitable manner that allows both lateral movement of the lever 42 relative to the output shaft 48 of the actuator 40, and rotation of the lever 42 relative to the output shaft 48 of the actuator 40 about a first axis 56. For example, a connector 58 may interconnect the first end 52 of the lever 42 and the shaft 48 of the actuator 40. The lever 42 is slideably moveable relative to the connector 58 for lateral displacement therebetween. As shown, a first roller 60 interconnects the shaft 48 of the actuator 40 and the connector 58 to form a pivotable connection therebetween to allow the lever 42 to rotate relative to the shaft 48 about the first axis 56.

The lever 42 is attached to the housing 22 at a lever connection location 62. The lever connection location 62 is disposed between the first end 52 and the second end 54 of the lever 42. More specifically, the lever connection location 62 is disposed across the clutch piston 32 (either the first clutch piston 32 for the lever 42 of the first actuation system 36, or the second clutch piston 34 for the lever of the second actuation system 38) from the first end 52 of the lever 42. In other words, the clutch piston 32 is disposed between the lever connection location 62 which connects the lever 42 to the housing 22, and the first end 52 of the lever 42 which connects the lever 42 to the actuator 40. Furthermore, the lever connection location 62 is disposed between the second end 54 of the lever 42 and the clutch piston 32. The lever 42 may be attached to the housing 22 in any suitable manner that allows rotation of the lever 42 relative to the housing 22 about a second axis 64. For example and as shown, a second roller 66 may interconnect the lever 42 and the housing 22 at the lever connection location 62 to form a pivotable connection therebetween to allow the lever 42 to rotate relative to the housing 22 about the second axis 64.

The lever 42 includes a contact portion 68 that is disposed between the lever connection location 62 and the first end 52 of the lever 42. The contact portion 68 is configured and shaped for engaging the clutch piston 32. As such, the contact portion 68 of the lever 42 for the first actuation system 36 is configured and shaped to engage the first clutch piston 32, and the contact portion 68 of the lever 42 for the second actuation system 38 is configured and shaped to engage the second clutch piston 34. As shown, the contact portion 68 of the lever 42 includes a first arm 70 and a second arm 72. Each of the first arm 70 and the second arm 72 extend between the lever connection location 62 and the first end 52 of the lever 42. The first arm 70 and the second arm 72 of the contact portion 68 cooperate to define an aperture 74 therebetween. The input shaft 26 extends through the aperture 74, with the first arm 70 and the second arm 72 of the contact portion 68 of the lever 42 each engaging the clutch piston 32 on opposing sides of the input shaft 26, thereby allowing pressure to be applied to the clutch piston 32 equally to prevent the clutch piston 32 from binding. It should be appreciated that the first arm 70 and the second arm 72 of the lever 42 of the first actuation system 36 engage the first clutch piston 32, whereas the first arm 70 and the second arm 72 of the lever 42 of the second actuation system 38 engage the second clutch piston 34.

The actuation system further includes a spring assembly 76. The spring assembly 76 is pivotably connected to the housing 22 at a spring connection location 78, and pivotably connected to the lever 42 at the second end 54 of the lever 42. The spring assembly 76 includes a piston 80 that is pivotably attached to the housing 22. A coil spring 82 is concentrically disposed about and supported by the piston 80. A sleeve 84 is pivotably connected to the second end 54 of the lever 42 and slideably coupled to the piston 80. As shown in FIGS. 2 and 3, the sleeve 84 defines a pocket 86 for receiving an end of the coil spring 82 therein. The coil spring 82 of the spring assembly 76 is pre-loaded with a spring force $F_S$. The spring force $F_S$ is directed outward, away from the spring connection location 78. Accordingly, the coil spring 82 biases the sleeve 84 outward against and away from the piston 80.

The piston 80 may be attached to the housing 22 in any suitable manner that allows for the piston 80 to rotate relative to the housing 22 about a third axis 88. For example, a third roller 90 may interconnect the piston 80 of the spring assembly 76 and the housing 22 to form a pivotable connection therebetween that allows the piston 80 to rotate relative to the housing 22 about the third axis 88. The sleeve 84 may be attached to the second end 54 of the lever 42 in any suitable manner that allows the sleeve 84 to rotate relative to the second end 54 of the lever 42 about a fourth axis 92. For example, a fourth roller 94 may interconnect the sleeve 84 of the spring assembly 76 and the second end 54 of the lever 42 to form a pivotable connection therebetween to allow the sleeve 84 to rotate relative to the lever 42 about the fourth axis 92. The first axis 56, the second axis 64, the third axis 88 and the fourth axis 92 are all parallel with each other. Additionally, the second axis 64, the third axis 88 and the fourth axis 92 are all co-planar with each other.

Referring to FIGS. 2 and 3, when the actuator 40 is disposed in the un-actuated position, the spring assembly 76 is positioned relative to the lever 42 such that the spring force $F_S$ is directed along a zero moment path 96. The zero moment path 96 is a linear path that extends perpendicular to and intersects the second axis 64, the third axis 88, and the fourth axis 92. Furthermore, the zero moment path 96 extends between and intersects the spring connection location 78 and the lever connection location 62. Because the spring force $F_S$ is directed along the zero moment path 96, which extends through the second axis 64, the third axis 88 and the fourth axis 92, the spring force $F_S$ does not apply a torque to the lever 42, and generates a zero moment, i.e., generates no moment, in the lever 42.

Referring to FIG. 4, the actuator 40 applies a force $F_A$ to the lever 42 during movement of the actuator 40 from the un-actuated position into the actuated position, which generates a moment $M_A$ that rotates the lever 42 about the lever connection location 62 and biases the contact portion 68 of the lever 42 against the clutch piston 32 to move the clutch piston 32 from the disengaged position into the engaged position. As the lever 42 rotates slightly about the lever connection location 62, the second end 54 of the lever 42 rotates as well. As the spring assembly 76 is connected to the second end 54 of the lever 42, the spring assembly 76 is thereby caused to rotate about the spring location connection. As the spring assembly 76 rotates about the spring location connection, the spring force $F_S$ is directed along a moment generating path 98, which is a path that does not intersect the lever connection location 62. Because the spring force $F_S$ is directed along a path that does not intersect the lever connection location 62, i.e., the second axis 64, the spring force $F_S$ applies a torque to the lever 42, which thereby introduces a non-zero moment $M_S$ in the lever 42, i.e., a moment having a value greater than zero. The non-zero moment $M_S$ generated in the lever 42 from the spring force $F_S$ of the spring assembly 76, works to rotate the lever 42 about the lever connection location 62, i.e., the second axis 64, and bias the contact portion 68 of the lever 42 against the clutch piston 32. As such, both the spring force $F_S$ and the actuator 40 force $F_A$ combine to move the lever 42.

The lever 42 applies a clutch force $F_C$ to the clutch piston 32 to move the clutch piston 32 from the disengaged position into the engaged position. The clutch force $F_C$ is dependent upon a magnitude of an actuator 40 force $F_A$ applied to the first end 52 of the lever 42 by the actuator 40, and a magnitude of the spring force $F_S$ applied to the second end 54 of the lever 42 by the spring assembly 76. It should be appreciated that the value of the clutch force $F_C$ is also dependent upon the length 100 of the lever 42 between the second axis 64 and the first axis 56, and the length 102 of the lever 42 between the second axis 64 and the fourth axis 92.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. A transmission for a vehicle, the transmission comprising:
  a housing;
  a dry clutch supported by the housing;
  a clutch piston supported by the housing and moveable in an axial direction between an engaged position for engaging the dry clutch and a disengaged position for disengaging the dry clutch; and
  an actuation system coupled to the clutch piston and operable to move the clutch piston from the disengaged position into the engaged position, the actuation system including:
    an actuator moveable between an actuated position and an un-actuated position;
    a lever having a first end and a second end, wherein the first end of the lever is attached to the actuator, wherein the lever is attached to the housing at a lever connection location disposed between the first end and the second end of the lever, and wherein the lever includes a contact portion disposed between the lever connection location and the first end for engaging the clutch piston;
    wherein movement of the actuator from the un-actuated position into the actuated position rotates the lever about the lever connection location to bias the contact portion of the lever against the clutch piston and move the clutch piston from the disengaged position into the engaged position; and a spring assembly pivotably connected to the housing at a spring connection location, and pivotably connected to the lever at the second end of the lever, wherein the spring assembly is pre-loaded with a spring force directed outward away from the spring connection location;

wherein the spring assembly is positioned relative to the lever such that the spring force is directed along a zero moment path extending between and intersecting the spring connection location and the lever connection location to generate a zero moment in the lever when the actuator is disposed in the un-actuated position; and wherein the spring assembly is positioned relative to the lever such that the spring force is directed along a moment generating path that does not intersect the lever connection location to generate a moment in the lever to rotate the lever about the lever connection location and bias the contact portion of the lever against the clutch piston to move the clutch piston from the disengaged position into the engaged position, when the actuator is disposed in the actuated position.

2. A transmission as set forth in claim 1 wherein rotation of the lever in response to the actuator moving from the un-actuated position into the actuated position rotates the second end of the lever about the lever connection location, thereby rotating the spring assembly about the spring connection location and changing the direction of the spring force from the zero moment path to the moment generating path.

3. A transmission as set forth in claim 1 wherein the lever applies a clutch force to the clutch piston to move the clutch piston from the disengaged position into the engaged position, wherein the clutch force is dependent upon a magnitude of an actuator force applied to the first end of the lever by the actuator, and a magnitude of the spring force applied to the second end of the lever by the spring assembly.

4. A transmission as set forth in claim 1 wherein the spring assembly includes a piston pivotably attached to the housing.

5. A transmission as set forth in claim 4 wherein the spring assembly includes a coil spring concentrically disposed about and supported by the piston.

6. A transmission as set forth in claim 5 wherein the spring assembly includes a sleeve pivotably connected to the second end of the lever and slideably coupled to the piston, wherein the coil spring biases the sleeve outward against and away from the piston.

7. A transmission as set forth in claim 1 further comprising an input shaft disposed concentrically with the clutch piston about a central axis, wherein the clutch piston is axially moveable along the central axis.

8. A transmission as set forth in claim 7 wherein the contact portion of the lever includes a first arm and a second arm, each extending between the lever connection location and the first end of the lever and cooperating to define an aperture therebetween.

9. A transmission as set forth in claim 8 wherein the input shaft extends through the aperture, with the first arm and the second arm of the contact portion of the lever each engaging the clutch piston on opposing sides of the input shaft.

10. A transmission as set forth in claim 1 wherein the actuator includes a rotary motor cooperating with a ball screw device to move a shaft in the axial direction.

11. An actuation system for actuating a clutch piston of a dual dry clutch transmission from a disengaged position into an engaged position, the actuation system comprising:

an actuator moveable between an actuated position and an un-actuated position;

a lever having a first end and a second end, wherein the first end of the lever is attached to the actuator, wherein the lever is pivotable about a lever connection location disposed between the first end and the second end of the lever, and wherein the lever includes a contact portion disposed between the lever connection location and the first end for engaging the clutch piston;

wherein movement of the actuator from the un-actuated position into the actuated position rotates the lever about the lever connection location to move the contact portion of the lever; and a spring assembly pivotable about a spring connection location, and pivotably connected to the lever at the second end of the lever, wherein the spring assembly is pre-loaded with a spring force directed outward away from the spring connection location;

wherein the spring assembly is positioned relative to the lever such that the spring force is directed along a zero moment path extending between and intersecting the spring connection location and the lever connection location to generate a zero moment in the lever when the actuator is disposed in the un-actuated position; and wherein the spring assembly is positioned relative to the lever such that the spring force is directed along a moment generating path that does not intersect the lever connection location to generate a moment in the lever to rotate the lever about the lever connection location.

12. An actuation system as set forth in claim 11 wherein the spring assembly includes a piston.

13. An actuation system as set forth in claim 12 wherein the spring assembly includes a coil spring concentrically disposed about and supported by the piston.

14. An actuation system as set forth in claim 13 wherein the spring assembly includes a sleeve pivotably connected to the second end of the lever and slideably coupled to the piston, wherein the coil spring biases the sleeve outward against and away from the piston.

15. An actuation system as set forth in claim 11 wherein the actuator includes a rotary motor cooperating with a ball screw device to move a shaft in the axial direction.

16. A dual dry clutch transmission for a vehicle, the dual dry clutch transmission comprising:

a housing;

a first dry clutch and a second dry clutch, each supported by the housing;

a first clutch piston and a second clutch piston, each supported by the housing and moveable along a central axis between an engaged position for engaging the first dry clutch and the second dry clutch respectively and a disengaged position for disengaging the first dry clutch and the second dry clutch respectively; and a first actuation system coupled to the first clutch piston and operable to move the first clutch piston from the disengaged position into the engaged position, and a second actuation system coupled to the second clutch piston and operable to move the second clutch piston from the disengaged position into the engaged position, each of the first actuation system and the second actuation system including:

an actuator moveable between an actuated position and an un-actuated position;

a lever having a first end and a second end, wherein the first end of the lever is attached to the actuator, wherein the lever is attached to the housing at a lever connection location disposed between the first end and the second end of the lever, and wherein the lever includes a contact portion disposed between the lever connection location and the first end for engaging the clutch piston;

wherein movement of the actuator from the un-actuated position into the actuated position rotates the lever about the lever connection location to move the contact portion of the lever; and a spring assembly pivotably connected to the housing at a spring connection location, and pivotably connected to the lever at the second end of the lever, wherein the spring assembly is pre-loaded with a spring force directed outward away from the spring connection location;

wherein the spring assembly is positioned relative to the lever such that the spring force is directed along a zero moment path extending between and intersecting the spring connection location and the lever connection location to generate a zero moment in the lever when the actuator is disposed in the un-actuated position; and wherein the spring assembly is positioned relative to the lever such that the spring force is directed along a moment generating path that does not intersect the lever connection location to generate a moment in the lever to rotate the lever about the lever connection location and move the contact portion of the lever.

17. A dual dry clutch transmission as set forth in claim 16 wherein the spring assembly includes a piston pivotably attached to the housing.

18. A dual dry clutch transmission as set forth in claim 17 wherein the spring assembly includes a coil spring concentrically disposed about and supported by the piston.

19. A dual dry clutch transmission as set forth in claim 18 wherein the spring assembly includes a sleeve pivotably connected to the second end of the lever and slideably coupled to the piston, wherein the coil spring biases the sleeve outward against and away from the piston.

* * * * *